United States Patent
Malfait et al.

(10) Patent No.: US 7,440,205 B2
(45) Date of Patent: Oct. 21, 2008

(54) VARIABLE INTENSITY DIMMER

(75) Inventors: Koen Malfait, Otegem (BE); Rik Defever, Kuurne (BE)

(73) Assignee: Barco N.V., Kortrijk (BE)

( * ) Notice: Subject to any disclaimer, the term of this patent is extended or adjusted under 35 U.S.C. 154(b) by 559 days.

(21) Appl. No.: 10/939,492

(22) Filed: Sep. 14, 2004

(65) Prior Publication Data

US 2006/0056023 A1    Mar. 16, 2006

(51) Int. Cl.
*G02B 5/22*    (2006.01)
(52) U.S. Cl. .................. 359/890; 359/888; 359/227
(58) Field of Classification Search ........... 359/888, 359/890
See application file for complete search history.

(56) References Cited

U.S. PATENT DOCUMENTS

| | | | |
|---|---|---|---|
| 3,538,335 A | 11/1970 | Tartanian | |
| 3,848,122 A | 11/1974 | Hutchison | |
| 4,290,473 A * | 9/1981 | Pierson et al. | 160/120 |
| 5,329,350 A | 7/1994 | Wright et al. | |
| 5,515,119 A * | 5/1996 | Murdock et al. | 352/131 |
| 6,580,560 B1 | 6/2003 | Benner, Jr. | |
| 2002/0027664 A1 | 3/2002 | Hyers et al. | |
| 2003/0035290 A1 | 2/2003 | Bornhorst | |
| 2003/0072161 A1 | 4/2003 | Hough et al. | |
| 2003/0086265 A1 | 5/2003 | Ilsaka et al. | |
| 2004/0027539 A1 | 2/2004 | Plunkett | |
| 2004/0037082 A1 | 2/2004 | Schmidt | |

OTHER PUBLICATIONS

Patent Abstracts of Japan, vol. 018, No. 541, Oct. 14, 1994 & JP 06 194585, Jul. 15, 1994.
Patent Abstracts of Japan, vol. 1997, No. 11, Nov. 28, 1997 & JP 09 197302, Jul. 31, 1997.
Patent Abstracts of Japan, vol. 017, No. 646, Nov. 30, 1993 & JP 05 207384, Aug. 13, 1993.

* cited by examiner

*Primary Examiner*—Arnel C Lavarias
(74) *Attorney, Agent, or Firm*—Bacon & Thomas, PLLC (57) ABSTRACT

A dimming system (300) for dimming electromagnetic radiation intensity of a radiating unit, such as e.g., an optical system. The dimming system (300) is adjusted to provide a constant electromagnetic radiation intensity over the cross-section of the impinging electromagnetic radiation beam by providing at least two dimming units (320, 330) each having a spatially variable position-dependent dimming behavior, such that the degree of dimming for the whole cross-section can be chosen to be a fixed selectable dimming factor. The dimming units (320, 330) may be based on spatially variable position-dependent dimming devices based on transparent substrates having a coating with a position-dependent varying transmission/reflection coefficient, on spatially variable position-dependent diffusing devices or on polarizer devices.

12 Claims, 8 Drawing Sheets

VARIABLE INTENSITY DIMMER

TECHNICAL FIELD OF THE INVENTION

The invention relates to a method and device for obtaining improved radiation characteristics in systems using electromagnetic radiation. More particularly, the invention relates to a method and device for obtaining an improved control of the electromagnetic radiation output of an electromagnetic radiation source, such as e.g. an improved control of the light output of an illumination system for use in an optical system.

BACKGROUND OF THE INVENTION

In systems using electromagnetic radiation, it is often useful to have some influence on the intensity of the electromagnetic radiation that is output by the system. In e.g. an X-ray system used for medical purposes, the intensity of the X-rays emitted often needs to be adjusted to the specific medical applications the radiation is used for. Another example is the use of light in optical systems such as in projection systems used for projecting strongly differing images. A further example are projection systems wherein more than one projector is combined. For example in simulation systems, it is highly desirable for all projectors in the system to have a comparable light output. This, amongst others, increases the homogeneity of the overall projected images. Therefore, it is an advantage if the generated light intensity for every single projection apparatus can be controlled and adjusted easily.

In some cases, the radiation output can e.g. be controlled by changing the power of the radiating system. However, very often this is either not possible or not possible in an efficient way, i.e. for example not easily or economically controllable. The use of a dimming means to limit or prohibit a part of the radiation, such as e.g. the light from the illumination system to be projected on the screen, may then offer a solution.

Often it is highly desirable to use one and the same radiation system for different purposes, whereby at one moment in time the radiation output should be high and at other moments the radiation output should be drastically reduced. A typical example is the use of a projection system for simulation purposes, wherein widely different situations need to be simulated. This can e.g. comprise simulation of military airplanes flying above hostile territory during day or at night. To simulate night conditions, reducing the signal provided to the projector, e.g. to 5% of its original value, will on the one hand lead to the screen looking dark as desired, but will at the same time also reduce the bit depth of the signal. This leads to details being no longer visible, which is disadvantageous for the simulation. By adjusting and controlling the light output obtained from the illumination source using a dimming means, no bit reduction occurs and thus the quality of the simulations remains.

Reduction of the E.M. radiation intensity using dimming means is known from different systems.

US-2003/0086265 describes a projection system with a dimming means comprising mechanical means to substantially block the light. The projection system comprises two fly-eye lenses and the dimming means can be positioned either in front of the first fly-eye lens, in between the two fly-eye lenses or after the second fly-eye lens. The invention is based on mechanical blocking of part of the light.

US-2003/0072161 describes a projection system wherein color filters and dimming means are provided to regulate the brightness on a corresponding screen. Preferably, plural evenly-spaced dimmer blades are used to block the light. A typical dimmer blade can be for example claw shaped.

Figure 1:
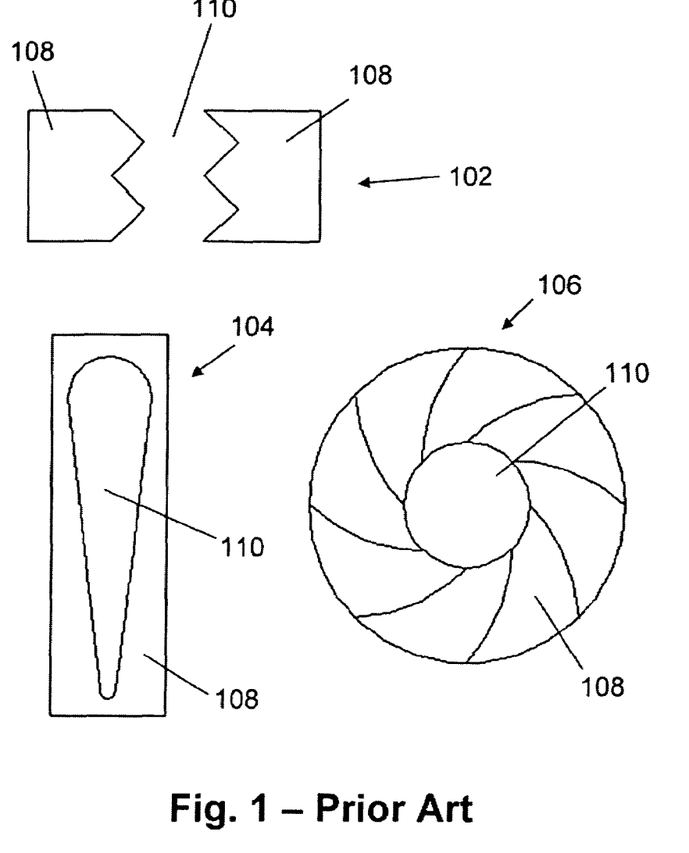
FIG. 1 is an illustration of some commonly used mechanical dimming means in prior art.

Other typical prior art dimming means 102, 104, 106 at present commonly used in systems using electromagnetic radiation, such as e.g. projection systems, are illustrated in FIG. 1. All these dimming means typically comprise at least one first area 108 that is completely blocking an electromagnetic radiation beam such as e.g. a light beam impinging on the dimming means 102, 104, 106 and at least one second area 110 that is completely or substantially completely transmitting the electromagnetic radiation beam such as e.g. a light beam impinging on the dimming means 102, 104, 106. The latter can be done by either providing a substrate transparent to the electromagnetic radiation beam used or by not introducing any material for dimming. From the prior art documents mentioned above and from the design of the typical prior art dimming means 102, 104, 106 it can be seen that dimming typically is performed by blocking exterior parts of the cross-section of the electromagnetic radiation beam. These mechanical dimming means have shortcomings: the transition from transmitting to blocking the electromagnetic radiation is abrupt, and can be represented by a discrete transmission function jumping from 100% to 0% at once, leading to non-homogeneity in radiation intensity on the screen. This is illustrated in the following example.

Figure 2A:
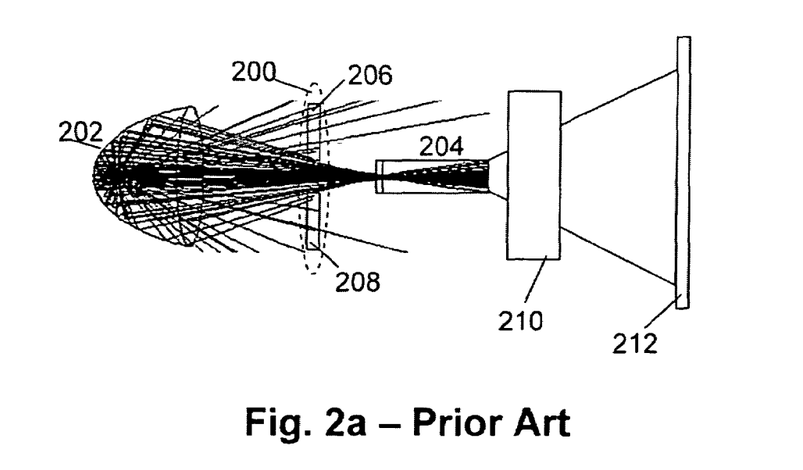
FIG. 2a is an illustration of the application of a mechanical dimming means in a projection system according to the prior art, having shortcomings as e.g. the influencing of the angular distribution of the emerging electromagnetic radiation.

By way of example, a more thorough description will be given of the commonly used dimming means used for light in projection systems. Nevertheless the general principles relate to each of the different types of electromagnetic radiation of the electromagnetic spectrum. The use of a dimming means 200 set-up in a projection system is illustrated in FIG. 2a. The projection system may e.g. have a light source with an elliptical reflector 202, which is focussed substantially close to the entrance of an integrating rod 204, a further processing means 210 and a screen 212. The dimming means 200 comprises e.g. 2 opaque—i.e. non-transparent—plates 206, 208, e.g. metal plates, that can be shifted with respect to each other in a direction substantially perpendicular to the direction of a light beam, and that allow to block exterior parts of the cross-section of the light beam. The reason for positioning of the dimming means 200 in front of the integrating rod 204 is the integrating nature of the rod 204. All light which enters the rod 204 is mixed so as to be uniform at the rod exit.

Figure 2B:
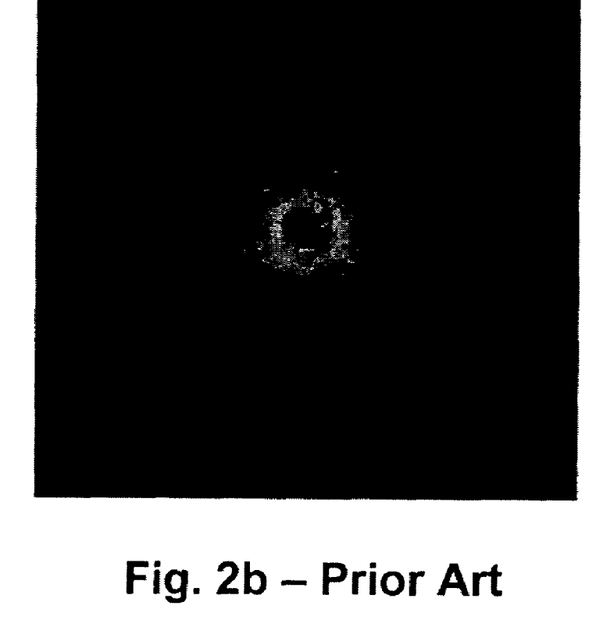

Nevertheless, as can be seen in FIGS. 2a and 2b, the dimmer will cut out light rays which in general have high angles of incidence. This leads to a reduction of the number of reflections in the integrating rod and therefore the screen uniformity will drop. This will even be worse for a spherical dimming aperture, such as demonstrated on the bottom right example of FIG. 1. In addition, filtering out one specific part of the angular space might introduce other artifacts, as e.g. commonly used dichroic coatings have spectral characteristics that vary strongly with the angle of incidence of the incoming light ray. A color change can therefore result from dimming.

Another option is to locate the dimming means behind the integrating rod. If the dimming means 200 would be located closely behind the exit of the rod 204, or close to the light valve, the dimming would be immediately visible on the screen 212 as a shadow. It would lead to severe non-homogeneities in the brightness distribution on the screen 212. The only good position to put a dimming means 200 in the relay optics (i.e. the optical path between the exit of the integrating rod and the light valve such as e.g. an LCD) is in a so-called aperture plane. This is an imaginary surface where the intersection points of the light rays are directly related to the angles of the rays on the display, being part of the further processing means 210. This is in fact the opposite of a surface such as the exit of the rod 204 and the light valve itself, where a position in the cross section of the light beam really corresponds to a position on the screen 212, as actually the display is an image of the integrating rod, and the screen 212 displays an image of the display itself. In other words, when the dimming needs to be done in the relay optics of a projection apparatus, dimming should always be performed in or close to the aperture plane of the projection system, in order not to affect the brightness homogeneity on the screen 212. Nevertheless, as the aperture plane is a very favorable position to put all different kinds of means for manipulating the image to be displayed—due to the anti-correlation of the position at this place with the position on the screen 212, the means cannot be seen as it is smeared out—such as for example contrast enhancing means or polarization recuperation means, it is unlikely that the dimming means 200 can also be located in the aperture plane.

In an alternative dimming means, described in U.S.-2003/0035290, the dimming is performed by gradually dimming the light beam over its complete cross-section. The dimming means comprises a spatially-modulated, variable-density, reflectively-coated dimming wheel which allows gradually dimming between 0% and 100% of the maximum light output of a corresponding projection system. The dimming is based on a reflective coating having a dotted pattern, the reflectivity of the coating thus varying along an appropriate path on the wheel. The density variation and its locus are preferably selected to achieve a smooth, linear change in intensity while also facilitating a quick transition from blackout to full brightness. The dimming wheel is used in combination with an intensity measuring feed-back sensor to control the dimming. Nevertheless, as there is a gradual change in the dimming capacity of the variable dimming wheel over the cross section of the impinging light, the dimming means introduces, albeit limited, unwanted inhomogeneities in the brightness distribution over the screen of the projection system, especially if the dimming means is not positioned in the aperture plane of the system and the light beam has a relatively large cross-section. These problems, indicated for optical radiation such as light, also are present for other types of electromagnetic radiation. Therefore, there is a need for a solution to obtain dimming of the electromagnetic radiation output of an E.M. radiation source, without substantially influencing the other properties of the E.M. radiation. This is especially the case for dimming of the light output of the light source in a projection system without substantially influencing the other properties of the light output of the light source, even if the dimming means is not positioned in the aperture plane.

SUMMARY OF THE INVENTION

It is an object of the present invention to provide an improved method and device for dimming the electromagnetic (E.M.) radiation output in a system using E.M. radiation, especially without substantially influencing the other properties of the E.M. radiation in the system.

The above objective is accomplished by a method and device according to the present invention.

The invention relates to a variable dimming system for dimming an electromagnetic radiation beam, comprising at least two dimming units, each of the at least two dimming units having a selectable dimming behavior, the at least two dimming units being such that their combined dimming behavior is spatially substantially constant over a cross-section of the electromagnetic radiation beam perpendicular to a direction of travel of the electromagnetic radiation beam. Each of the dimming units interacts with the complete cross-section of the light beam during dimming. The combined dimming behavior may be selectable at least within a sub-range of the range 0% to 100%. Each of the at least two dimming units may have a dimming characteristic which is position dependent with respect to the cross-section of the electromagnetic radiation beam. The spatially substantially constant dimming behavior may include having a mean dimming factor over said cross-section, the dimming behavior over the cross-section being within at least 5% of said mean dimming factor, preferably within at least 3% of said mean dimming factor, more preferably within at least 1% of said mean dimming factor, even more preferably within at least 0.1% of said mean dimming factor. The position-dependent dimming characteristic of each of said dimming units may be based on areas of the dimming unit having a different attenuation behavior of said electromagnetic radiation. Attenuation may comprise the way of reducing the intensity of the electromagnetic radiation. Furthermore, the position-dependent dimming characteristic of each of the dimming units may comprise a substantially complete attenuation of the electromagnetic radiation beam in a first area of the dimming unit, substantially no attenuation of the electromagnetic radiation beam in a second area of the dimming unit and a continuously decreasing attenuation on a trajectory between the first and the second area. The variable dimming behavior of the dimming units thus also is a spatial variable dimming behavior over the surface of the dimming units. The variable dimming system may comprise exactly two dimming units, wherein said continuously decreasing attenuation of the first dimming unit substantially changes according to a first functional behavior and said continuously decreasing attenuation of the second dimming unit substantially changes according to a second functional behavior, such that combination of the first and the second functional behavior is substantially a constant. The combination of the first and the second functional behavior may comprise multiplication of functions related to the first and second functional behavior. The first functional behavior may be expressed by an exponential function and the second functional behavior may be expressed by a function which is an inverse of said exponential function. For each of the dimming units, the attenuation behavior may be one of a transmissivity behavior, a reflectivity behavior or a diffusivity behavior. With the latter is meant that the dimming unit comprises means to diffuse the electromagnetic radiation beam.

The invention furthermore relates to a system using electromagnetic radiation comprising a variable dimming system for dimming an electromagnetic radiation beam wherein the variable dimming system comprises at least two dimming units, each of the at least two dimming units having a selectable dimming behavior, the at least two dimming units being such that their combined dimming behavior is spatially substantially constant behavior over a cross-section of the electromagnetic radiation beam perpendicular to a direction of travel of the electromagnetic radiation. The system may comprise light guiding means having an aperture plane, wherein said variable dimming system may be positioned in the electromagnetic radiation path significantly upstream or significantly downstream said aperture plane. The system furthermore may comprise feedback means for generating a signal representative of a dimming fraction of the electromagnetic radiation. The feedback means may comprise a sensor. The system furthermore may comprise means for automatically adjusting the variable dimming system based on the signal obtained from the feedback means. The system may be a projection system using visual or near infrared light.

The invention also relates to a method for dimming an electromagnetic radiation beam, the method comprising selecting a dimming behavior of at least a first and a second dimming unit and combining the selected dimming behavior of each of the at least first and second dimming units such that the combined dimming behavior is spatially constant over a cross-section of an impinging electromagnetic radiation beam.

The invention furthermore relates to a projection system for projecting a light beam, the projection system comprising a variable dimming system for dimming the light beam, the variable dimming system comprising a first polarizing means and a second polarizing means, whereby the first polarizing means is adjusted for selecting a first polarization state of the light beam and the second polarizing means has a selectable dimming behavior allowing selection of a fraction of the light intensity of the light beam having the first polarization state.

The invention also relates to a method for dimming a light beam in a projection system, comprising selecting a polarization state of the light beam using a first polarizing means, and adjusting a second polarizing means to select a fraction of the light intensity of the light beam having the first polarization state.

Moreover, the invention also relates to a variable dimming means for dimming a light beam on a light path, the variable dimming means comprising a diffuser unit, wherein said diffuser unit has a position-dependent diffusing characteristic with respect to the position in the diffuser unit for scattering a selectable fraction of light from said light beam out of the light path. The diffuser unit may be constructed in one single piece. The position-dependent diffusing characteristic may be introduced during manufacturing based on holographic methods.

The invention furthermore relates to a projection system for projecting a light beam, the projection system comprising a variable dimming system for dimming the light beam, the variable dimming system comprising a diffuser unit having a position-dependent diffusing characteristic with respect to the position in the diffuser unit for scattering a selectable fraction of light from said light beam out of the light path. The variable dimming system furthermore may comprise an aperture positioned downstream the light path compared to the diffuser unit.

The invention furthermore relates to the use of a dimming system, a projection system or a dimming method as described above for matching the light output of different projectors, e.g. in a multi-projector system, having inherent differences in light output. The invention also relates to the use of a dimming system or dimming method as described above in a projector used for projecting images in day mode and used for projecting images in night mode. The invention furthermore relates to the use of a dimming system, a projection system or a dimming method as described above for displaying images using dynamic contrast enhancement.

Particular and preferred aspects of the invention are set out in the accompanying independent and dependent claims. Features from the dependent claims may be combined with features of the independent claims and with features of other dependent claims as appropriate and not merely as explicitly set out in the claims.

It is an advantage of several embodiments of the present invention that the dimming means, although only influencing the intensity of the E.M. radiation output, do not need to be positioned in the aperture plane of the system using E.M. radiation, thereby keeping open the possibility of providing contrast enhancement means or polarization recuperation means in the aperture plane.

It is also an advantage of the present invention that the dimming means can be positioned after an E.M. radiation homogenizing means, while still being able to influence the E.M. radiation intensity, without influencing the homogeneity of the output over the cross-section of the E.M. radiation beam.

It is furthermore an advantage of the present invention that the dimming means do not substantially influence the homogeneity of the brightness on a display screen.

It is moreover an advantage of the present invention that the dimming means allows dimming of the E.M. radiation output in an optical system without influencing the image content details.

It is a further advantage of the present invention that the dimming means can be adjusted for dimming with a dimming degree at any selectable value between complete dimming and substantially not influencing the light output while still having the advantage of substantially not influencing the other characteristics of the E.M. radiation output of a system.

It is also an advantage of the present invention that the dimming means can be made of heat resistant materials or that the dimming means can be positioned downstream the homogenizing means such that local heating problems for the dimming means are reduced.

Although there has been constant improvement, change and evolution of devices and methods of dimming, the present concepts are believed to represent substantial new and novel improvements, including departures from prior practices, resulting in the provision of more efficient and reliable devices of this nature. The teachings of the present invention permit the design of improved methods and apparatus for dimming the E.M. radiation output of systems, such as e.g. lighting systems for optical devices.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 2b is an illustration of an E.M. radiation beam affected by a dimming system applied as shown in FIG. 2a.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 3:
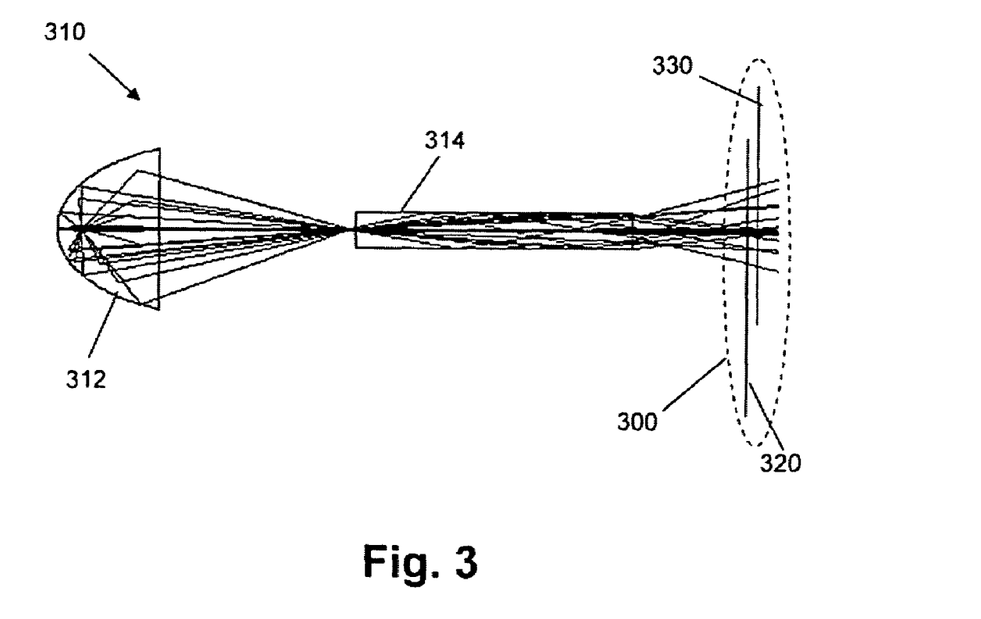
FIG. 3 is an illustration of a dimming system according to a first embodiment of the present invention, used in a projection system.
Figure 4A:
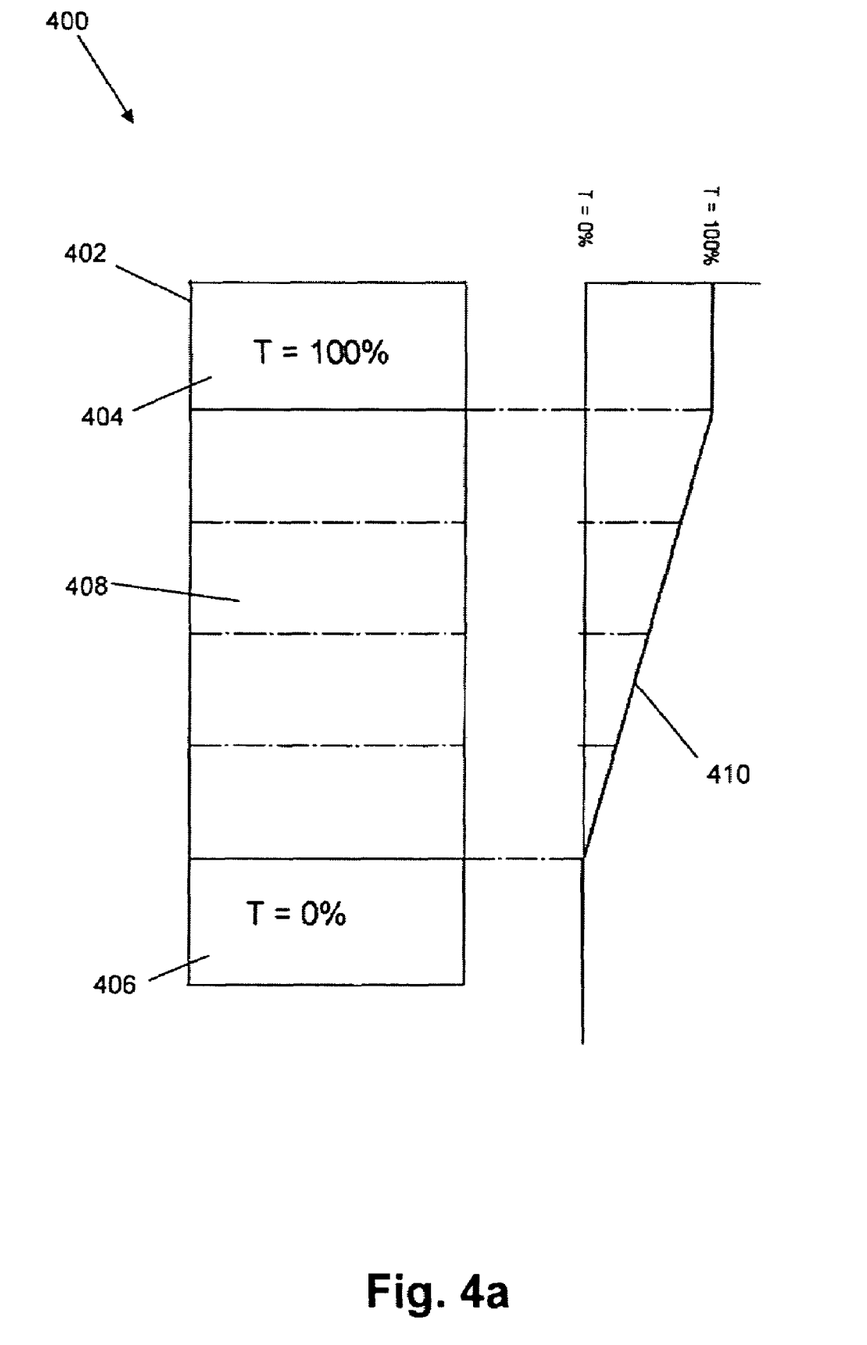
FIG. 4a is an illustration of a possible configuration for a variable dimming means that can be used as a dimming unit in a dimming system, according to the first embodiment of the present invention.
Figure 4B:
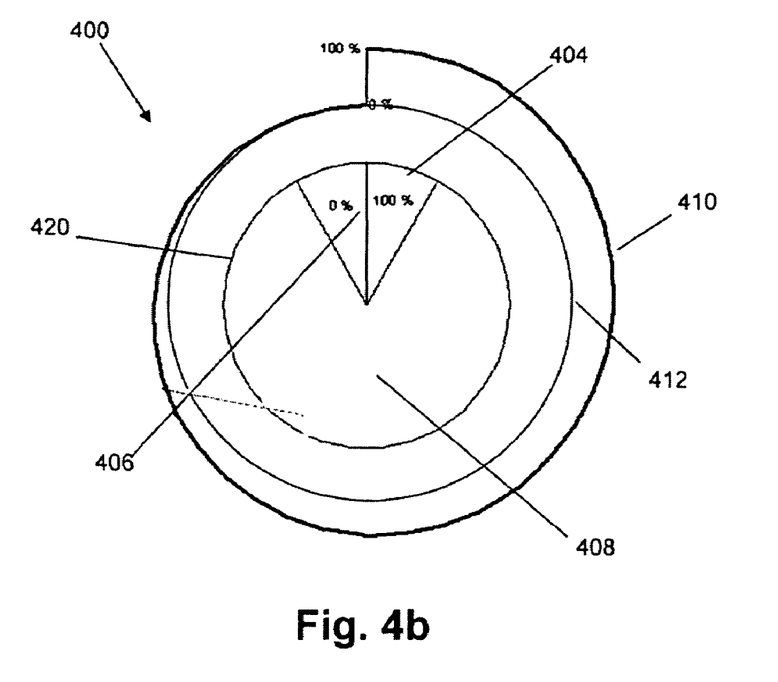
FIG. 4b is an illustration of another possible configuration for a variable dimming means that can be used as a dimming unit in a dimming system according to the first embodiment of the present invention.

In a first embodiment, the invention relates to a dimming system 300 that provides a dimming behavior such that the dimming is substantially constant over the complete cross section of the impinging electromagnetic radiation beam, e.g. light beam, while the dimming system 300 still allows to select a specific degree of dimming, in other words, while the dimming system 300 still is a variable dimming means. Such dimming system 300 typically is part of a system 310 using E.M. radiation, as illustrated in FIG. 3. The system 310 using E.M. radiation may be any type of system such as an X-ray apparatus, a device using UV-radiation or an optical system such as a projection system. The system 310 using E.M. radiation may comprise a source 312 for generating the E.M. radiation, a means 314 for guiding and/or homogenizing the E.M. radiation in the system, and any other type of components that can be used such as filters, mirrors, lenses, modulators, etc. A typical example of such a system 310 is an optical projection system. It may comprise a light source 312, a light homogenizing means 314 such as e.g. a light pipe and further optical components (not shown in FIG. 3). The projection system where the dimming system of the present invention is used in, can be any type of projection system such as a standard projection system, a multiple projection system, a dual lamp projection system, etc. The projection system may be used for any purpose like e.g. but not limited to, simulation systems. The light source 312 in projection systems can be any conventional light source used in a projection system, such as, but not limited to, xenon lamps, high pressure mercury lamps, halogen lamps or metal halide lamps. Also less conventional light sources can be used, such as e.g. diode arrays. The type of light source used thus is non limiting for the present invention, as will be appreciated by a person skilled in the art. By way of example, a light source 312 with an elliptical mirror is shown in FIG. 3. Other types of light source housings, comprising e.g. a parabolic mirror or not comprising mirror means for focussing, can also be used. The output power of the light source may be up to kilowatts, as long as the dimming system can withstand the released heat. The size of the cross-section of the beam of E.M. radiation, and the total power of the beam are important. It is an advantage of the dimming system of the present invention that the dimming means can be positioned after the homogenizing means 314 such that the local light intensity is lower than what it would be in front of the homogenizing means 314. In the projection setup, the dimming system 300 can be—but does not have to be—rotated by an angle θ with respect to the normal to the optical axis, in order to prevent all reflected light to re-enter the light source 312, causing lifetime degradation of the light source 312. This reflected light not reentering the light source 312 may be absorbed by some heat sink (not shown in FIG. 3). The dimming system 300 of the present invention typically is positioned outside the aperture plane of the system 310 to allow to place other E.M. radiation influencing means in the aperture plane, such as e.g. polarizing means, contrast enhancing means, etc. The dimming system 300 of the present invention typically is positioned at the exit of an E.M. radiation homogenizing means 314, such as e.g. an integrating rod or a light valve of an optical system, where the peak intensity within the beam profile is substantially lower than in front of the E.M. radiation homogenizing means 314. A standard variable dimming means, existing from a single variable dimming means, does not allow to obtain a substantially constant dimming over the complete cross-section of the E.M. radiation beam, as over the cross-section of the E.M. beam with the standard variable dimming means there is a spatially variation of the dimming capacity of the variable dimming means. The dimming system 300 of the present invention is adjusted to guarantee that a substantially constant dimming is applied over the complete cross-section of the E.M. radiation beam by using at least two dimming units 320, 330 in combination with each other. The dimming system 300 provides a position-dependent dimming, i.e. the degree of dimming of the E.M. radiation beam impinging on the dimming system 300 depends on the relative position where the E.M. radiation beam has its cross section on the dimming units 320, 330 of the dimming system 300, with reference to the dimming units 320, 330 themselves. Position-dependent thus refers to the relative position of the E.M. radiation beam with respect to the dimming units 320, 330, not referring to the position of the dimming units 320, 330 in the system using E.M. radiation. It is an advantage of the variable dimming system of the present embodiment that dimming of the E.M. radiation output of a projection system to as much as 90% or below 10%, below 1%, or even below 0.1% can be obtained without losing the performance quality of the system. The dimming system thereby can be placed on any suitable place in the system using E.M. radiation. The dimming system 300 has no influence on the performance of the system using E.M. radiation, except for the E.M. radiation output level. In order to obtain a variable dimming system 300, the dimming units 320, 330 each are variable dimming means. The dimming units can be any type of variable dimming means which allows to select substantially any degree of dimming between substantially 0% and 100% or at least a sub-range, i.e. interval, from the range 0%-100%. The attenuation may be e.g. based on transmissivity, reflectivity or diffusivity. By way of example, two different types of variable dimming means that can be used for each of the dimming units 320, 330 are discussed in more detail in the following paragraphs, although the invention is not limited thereto. A first type of variable dimming means that can be used as dimming unit 320, 330 is shown in FIG. 4a and FIG. 4b. The variable dimming means 400 are based on a substrate 402 having a gradient dimming behavior such that it allows dimming of an impinging electromagnetic radiation beam to any intensity level between substantially blocking the complete radiation intensity and substantially preserving the full radiation intensity of the impinging electromagnetic beam. The dimming means 400 preferably is based on transmission of the impinging E.M. radiation although it is also possible, by adjusting the specific positions of the dimming units relative to each other, to use dimming means 400 based on reflection. It is to be noted that, in the present application, substantially blocking the electromagnetic radiation will also be referred to as having a transmission/reflection coefficient (depending on whether dimming is based on transmission or on reflection) of 0% and substantially transmitting/reflecting (depending on whether dimming is based on transmission or on reflection) the full intensity will be referred to as having a transmission/ reflection coefficient (depending on whether dimming is based on transmission or on reflection) of 100%. It will be clear to a person skilled in the art that for these values abstraction is made from a possible small radiation intensity loss by e.g. absorption in the transparent substrate material or by a possible small amount of E.M. radiation that is transmitted or reflected anyway if complete blocking is to be performed, due to imperfectness of the materials used for the dimming means. If a transparent substrate 402 is needed, this may be made of any type of material having good optical properties, i.e. good transparency, such as e.g. glass-like material, quartz or $SiO_2$. In addition, e.g. in a projection apparatus, the thermal properties of the material have to be such that the substrate 402 can withstand the high radiation intensity, e.g. the high illumination intensity inherent to a high power projection apparatus. It will be clear for a person skilled in the art that the transparency of the substrate material relates to transparency for the wavelengths emitted by the radiation source, or in some cases, to wavelengths that need to be imaged on the screen. In the latter case, e.g. in the case of light in a projection system, the substrate material also may act as a cold/hot mirror, thereby allowing to remove light that is not useful for imaging but that is present in the spectrum of the light source. These unwanted wavelength regions often are in the infrared region and the UV region. Light from these wavelength regions may also be filtered out using e.g. an additional filter or an additional cold mirror. The gradient dimming behavior is typically obtained by coating the transparent substrate 402, but the invention is not limited thereto. It may be obvious for a person skilled in the art that the different regions in the dimming means 400 may also be obtained by e.g. implanting absorbing impurities in the transparent substrate 402 or by providing e.g. surface roughness leading to different transmission/reflection behavior. By way of example, the dimming means for the dimming units 320, 330 used in the dimming system 300 according to the first embodiment of the present invention will be further described for a gradient dimming behavior based on a coating. If the dimming means 400 is used in a transmission setup, the coating typically is used for reflecting the unwanted part out of the electromagnetic radiation path of the system. If, on the other hand, the dimming means 400 is used in a reflection setup, the coating typically is used to reflect the wanted part to the electromagnetic radiation path of the system and the unwanted part of the electromagnetic radiation is transmitted through the dimming means 400, out of the electromagnetic radiation path of the system. The coating applied to provide opaque/reflecting parts of the dimming means can be any suitable coating such as e.g. a metallic coating, e.g. aluminum-based, a dichroic filter, etc. Deposition techniques typically used for the fabrication of this coating are sputtering, evaporation, spincoating, printing, dip coating, etc. It will be obvious for a person skilled in the art that the fabrication of such variable dimmer means are not limited to these techniques.

Figure 4C:
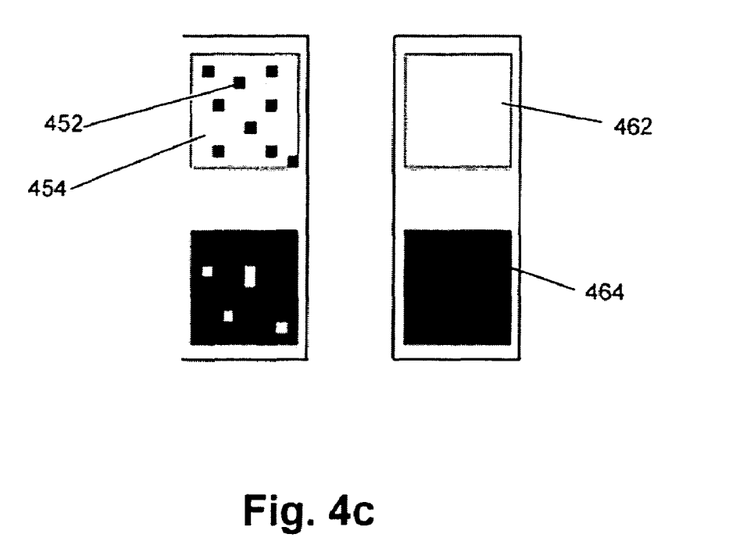
FIG. 4c is an illustration of different ways for obtaining a variable dimming behavior for a variable dimming means as shown in FIG. 4a and FIG. 4b.

FIG. 4a and FIG. 4b both illustrate a different design for a dimming means 400 having a gradual dimming behavior over its surface in between a part being substantially completely transmitting and a part being substantially completely blocking the electromagnetic radiation beam. FIG. 4a illustrates a rectangular transparent substrate 402 coated in such a way that a first part 404 of the substrate 402 is transparent, i.e. having a transmission coefficient of 100%, and a second part 406 of it is opaque/reflecting, i.e. having a transmission coefficient of 0%. Between these two extremes, an area 408 with a gradient dimming behavior is applied, leading to a transmission curve 410 as shown in the corresponding transmission graph on the right hand side of FIG. 4a. This gradient transition between 0% and 100% overcomes the problems introduced by the brutal 0%-100% step transition in the prior art mechanical dimming means. The slope of the transmission curve does not need to be linear, but can for example be curved. The dimming means 400 may have any suitable size, such as e.g. ±15 mm×±100 mm, when the bundle cross-section is somewhat smaller than 15 mm. FIG. 4b illustrates a second design for a gradually dimming dimming means 400. This design corresponds with a dimmer wheel 420, wherein again a first part 404 is present that is substantially transparent (transmission T=100%) and a second part 406 is present that is substantially completely blocking (transmission T=0%). The wheel 406 furthermore comprises an area 408 with gradient dimming behavior wherein the transparency gradually increases from 0% to 100%. The transparency in the different sectors of the disc is shown in the transmission curve 410, illustrated above each sector of the dimmer wheel 420, with reference to a baseline 412. A coating providing the gradual dimming behavior in area 408 with gradient dimming behavior can be obtained in several ways. Two specific examples are shown in FIG. 4c. The applied coating can consist of very small coated spots 452, causing 100% absorption or reflection of impinging electromagnetic radiation, whereby the rest of the surface 454 is either not coated or is coated with e.g. an anti-reflection coating such that optimum transmission of the incident electromagnetic radiation is obtained. The amount of dimming is then determined by the density of the non transparent coated spots 452. For dimming means used in a transmission setup, the spots 452 perform blocking by either reflecting or absorbing the electromagnetic radiation in the electromagnetic radiation beam. The spots should be significantly small, as e.g. for a spotsize of 0.1 mm, the effect on the corresponding light modulating means in e.g. a projection system typically is of the range of 10 pixels of the light modulating means, which might be of some impact on the image quality, e.g. when the dimming means is located nearby an image plane. For dimming means used in a reflection setup, the amount of electromagnetic radiation reflected by the spots 452 is used further in the system using electromagnetic radiation and the electromagnetic radiation transmitted through the transparent substrate corresponds with the unwanted electromagnetic radiation. In these cases, the coating thus needs to be highly reflective. A second possibility is that the coating is applied uniformly on the glass substrate but with changing transmissivity or spectral characteristics over the surface of the substrate, such that at least a part of the electromagnetic radiation beam is blocked. This is illustrated by coating 462 providing a transmission of Y % and coating 464 providing a transmission of Z %, Z being smaller than Y. In addition, the characteristics of the filter is not limited to flat spectral characteristics such as a so-called neutral density filter. The invention also relates to a dimming means having a gradient dimming behavior which has no flat spectral response, e.g. in the case of light, the dimming means may be reflecting ultraviolet or infrared radiation. Although this type of dimming means has been described for a coated substrate, the invention is not limited thereto. Other types of transmitting/reflecting plates also can be used, such as e.g. a metal plate wherein small holes are provided such that part of the E.M. radiation beam is transmitted, while another part of the beam is e.g. reflected.

Figure 5:
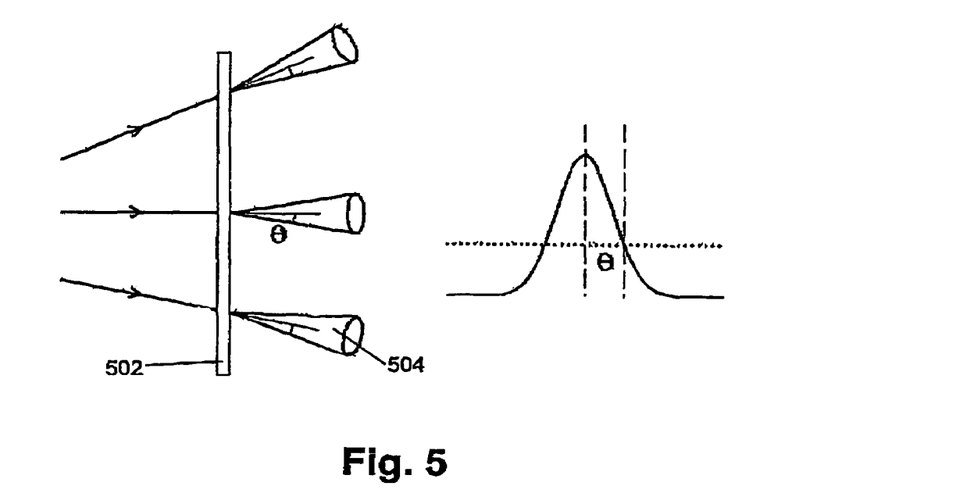
FIG. 5 is an illustration of the operating principle of a diffuser that can be used in a dimming system according to a second embodiment of the present invention.
Figure 6:
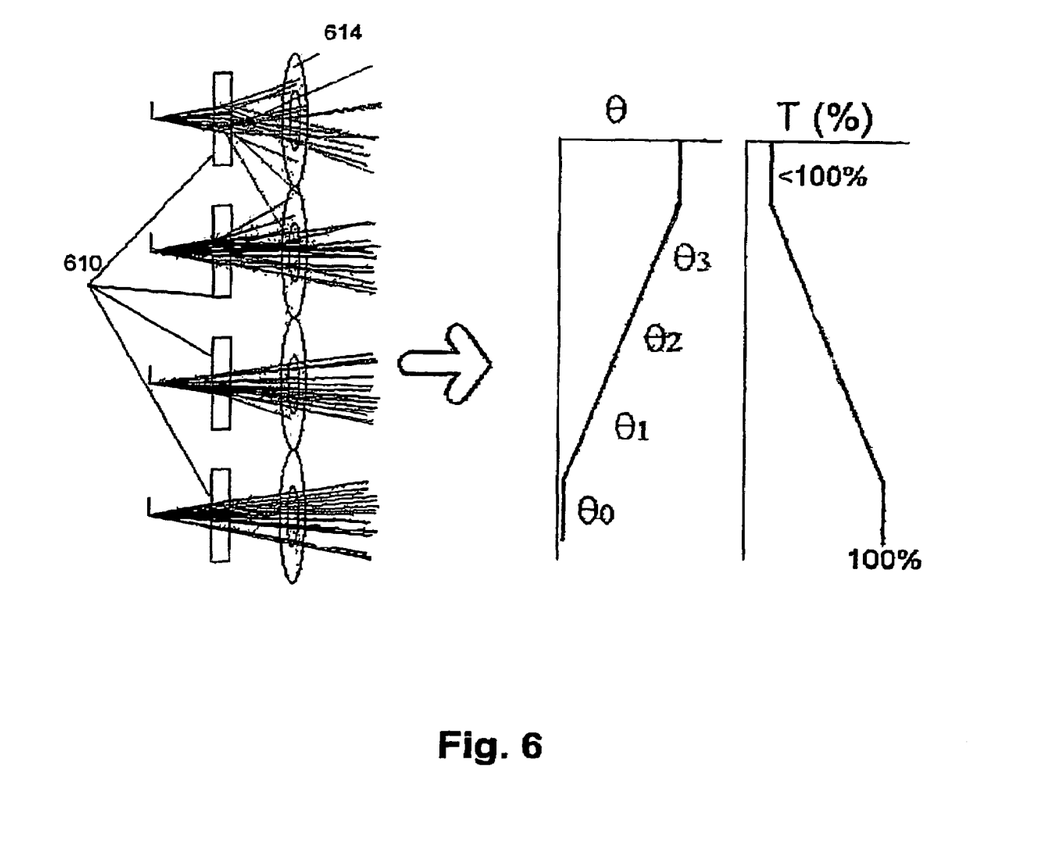
FIG. 6 is an illustration of the use of a gradient diffusing means as dimming means, for use in a dimming system according to the second embodiment of the present invention.

A second embodiment of variable dimming means is based on regulating the amount of E.M. radiation that is coupled to the system 310. Whereas most systems typically are designed so that the E.M. radiation incoupling is optimized for coupling a maximum amount of electromagnetic radiation to e.g. a radiation modulating means, such as e.g. a light valve in a projection system, and thus so that a maximum amount of E.M. radiation can end up at the screen, the variable dimming means of the present example uses controlling and adjusting of the amount of E.M. radiation that is coupled into the optical system as a means for controlling the E.M. radiation intensity. By using a diffuser 502 as variable dimming means, the efficiency of the system and consequently the E.M. radiation output, can be altered. The principle of scattering by a diffuser is demonstrated in FIG. 5. A diffuser 502 alters the direction of a electromagnetic radiation ray passing through. In the demonstrated example, the propagation direction behind the diffuser 502 is distributed in a Gaussian way. The probability is the highest that the electromagnetic radiation will follow its original direction, but the direction of the E.M. radiation can be altered as well. The emerging cone of E.M. radiation 504 is characterized by an angle $\Theta$, defined as the angle between the direction of maximum intensity and the direction in which the intensity of the E.M. radiation is a fraction 1/e of the maximum intensity, the maximum intensity in the present example being in the original direction. For simplicity, we will refer to this angle $\Theta$ as the opening angle. The opening angle $\Theta$ of the emerging cone 504 can be adjusted by adjusting the manufacturing process of the diffuser, e.g. in the case of diffusers for optical light, this can be obtained using holographic methods. Such diffusers are e.g. available from Physical Optics Corporation. In order to use a diffuser 502 as variable dimming means in a system using E.M. radiation, a diffuser 502 with a gradient in the diffusing characteristics and an aperture downstream the diffuser 502 on the electromagnetic radiation path need to be positioned. The aperture may be formed by an aperture means inherently present in the optical system, such as e.g. determined by the diameter of the projection lens or it may be additionally provided. The variable diffusing means combined with the aperture allows to select the amount of E.M. radiation coupled in, by diffusing a smaller or a larger part of the E.M. radiation beam outside the aperture. This is demonstrated in FIG. 6, where, at the left-hand side, different diffuser plates 610 with different opening angles $\Theta$ are shown. The opening angles $\Theta$ illustrated in FIG. 6, are varying such that the opening angles of the diffuser plates from bottom to top correspond with $\theta_0 < \theta_1 < \theta_2 < \theta_3$. The value for the opening angles $\Theta$ thus increases from bottom to top. Behind each diffuser plate 610, an aperture 614 is provided to demonstrate the effect. As can be seen, the larger the value for opening angle $\Theta$, the less rays are transmitted through a so-called aperture 614, which limits the mechanical dimensions of the system. The transmission T depends on the opening angle $\Theta$ of the diffuser at that location. The diffuser plates 610 can be combined on one piece of diffusing means. If the diffusing means is manufactured and positioned so that the electromagnetic radiation spot is small with respect to the diffusing means, which can be in any suitable shape such as a plate having a gradual diffusing behavior in a direction along a length of the plate or a wheel having a gradual diffusing behavior around the perimeter of the wheel itself, a shift or rotation of the diffusing means with respect to the electromagnetic radiation spot will result in a changing dimming behavior and evidently, in another dimming level. A drawback is that dimming to very low brightness will become difficult, as a diffuser characteristic of this Gaussian shape always yields a non-negligible maximum at zero degree deviation. As a consequence, the minimum transmission T can be denoted as being less than 100%, but it cannot be specified to very low values in general. This can be solved by using diffusing filters with small forward biases.

Figure 7A:
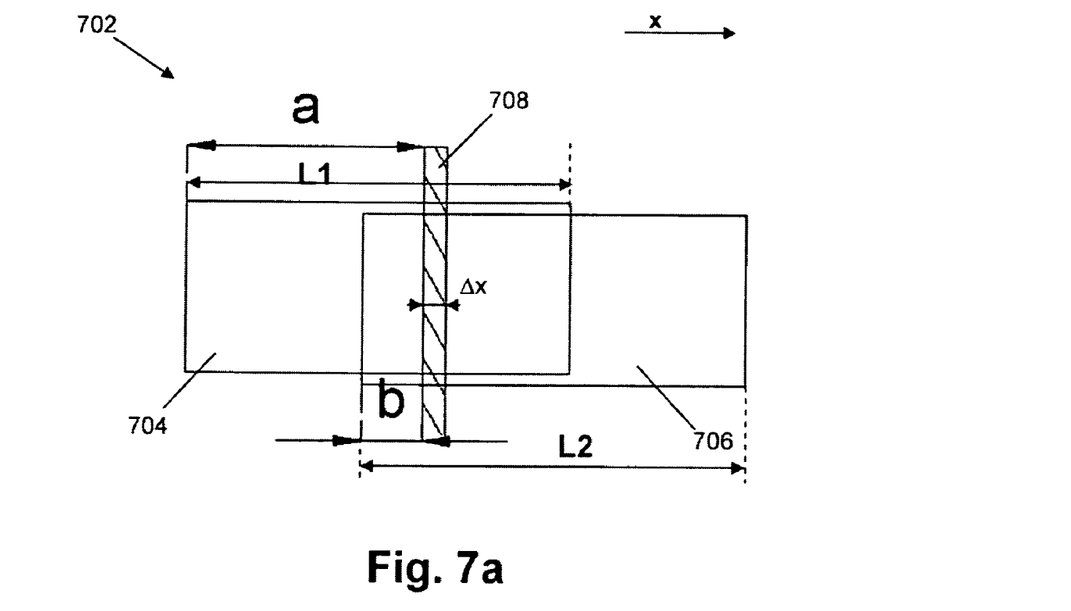
FIG. 7*a* is an illustration of the relative positioning of two combined dimming units in a possible configuration according to the first embodiment of the present invention.
Figure 7B:
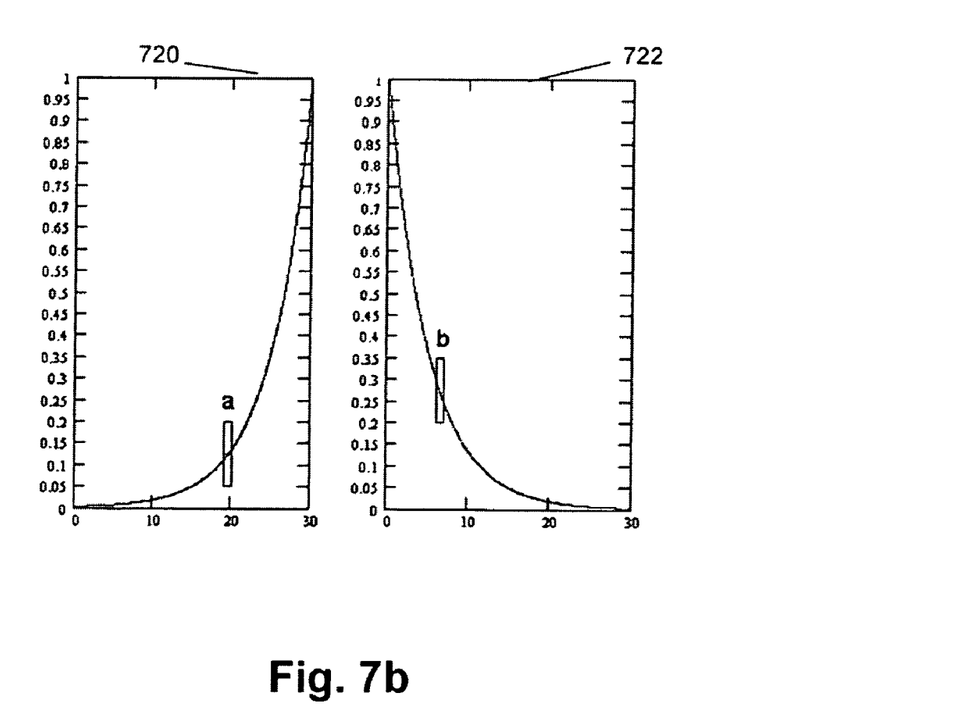
FIG. 7*b* is an exemplary illustration of the transmission behavior of each of the two combined dimming units of the dimming system as shown in FIG. 7*a*, according to the first embodiment of the present invention.
Figure 7C:
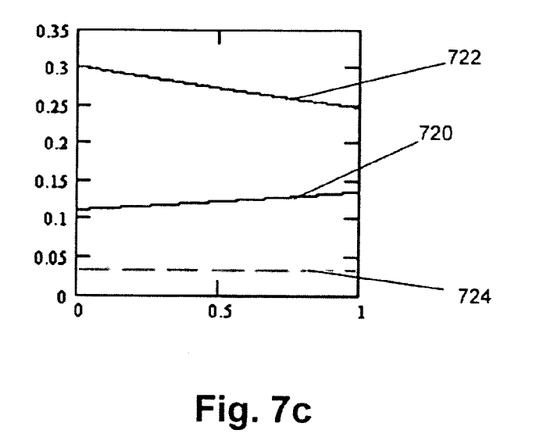
FIG. 7*c* is an exploded view of the transmission behavior of each of the two combined dimming units and of the resulting transmission behavior, for a dimming system used in a configuration as shown in FIG. 7*a*.

Returning now to the further description of the dimming system 300 having a dimming behavior that is substantially equal over the whole cross section of the impinging E.M. radiation beam. This dimming behavior is obtained by specifically selecting the variable dimming behavior of the dimming units 320, 330. As the dimming effect of the combined dimming units 320, 330 is to be determined as the product of the dimming effect of the first dimming unit 320 and the dimming effect of the second dimming unit 330, it is not possible to obtain a linear or flat dimming behavior over the cross-section if the dimming behavior of the dimming units corresponds with a linear dimming gradient. A substantial constant dimming behavior over the cross-section of the impinging E.M. radiation beam can be obtained if the variable dimming behavior of the dimming units 320, 330 are adjusted such that the first dimming unit 320 has a dimming behavior that shows over the cross section an inverse functional behavior as the dimming behavior of the second dimming unit 330, such as e.g. an exponentially inverse functional behavior. The resulting dimming behavior is then significantly independent of the position at which the E.M. radiation intersects the first dimming unit 320 and the second dimming unit 330 such that no substantial effect will be witnessed on the screen. By way of example, an illustration is given in FIG. 7a for a dimming system 702 with two dimming units 704, 706 having an exponential attenuation characteristic, the attenuation characteristic of the first dimming unit 704 being the inverse of the attenuation characteristic of the second dimming unit 706. Although in the example given, the attenuation is based on amount of transmission, similar examples can be given for other type of attenuation means, such as e.g. based on reflection or diffusion of the electromagnetic radiation beam. The two dimming units 704, 706 with spatially varying, exponential dimming behavior and the cross-section 708 with the impinging electromagnetic beam are shown in FIG. 7a. The dimming units 704, 706 thus each comprise an area where the light beam is substantially completely blocked, an area where the E.M. radiation beam is substantially completely transmitted and an area in between wherein the dimming behavior has an exponential dimming behavior with respect to the position in the dimming unit 704, 706, going from substantially completely blocking to substantially completely transmitting or inverse. In other words, the dimming behavior may e.g. along a straight trajectory between the area of substantially complete blocking and the area of substantially complete transmission, follow an exponential curve. In FIG. 7b and FIG. 7c, the attenuation behavior as a function of the position of the dimming unit 704, 706 with respect to the impinging E.M. radiation beam is shown for the exponential attenuating behavior of the dimming units. By shifting the dimming units 704, 706 with respect to the cross-section 708 of the impinging E.M. radiation beam, the transparency at the position of the cross-section 708 with the E.M. radiation beam can be changed for each of the dimming units 704, 706. By shifting the dimming units 704, 706 independent of each other, the appropriate amount of dimming for the total dimming system 702 can be obtained. It can be seen that two dimming units 704, 706 with such an exponential gradient in inverse sense fulfill the needs for allowing the dimming system 702 to obtain exact constant dimming over the cross-section of the impinging electromagnetic radiation beam. For a first dimming unit 704 having a length $L_1$ and a second dimming unit 706 having a length $L_2$, the inverse exponential attenuation behavior is shown in FIG. 7b. The dimming units 704, 706 have a varying dimming behavior along their length, i.e. in the x-direction indicated in FIG. 7a. The lengths of the dimming units 704, 706 may be equal, but the invention is not limited thereto. In addition, the invention is not limited to a dimmer means with a full dimming range from 0 to 100%. Also a dimming means from e.g. 50-90% is included within the scope of the invention, if this range is more suitable for the application in question. In general, the components are taken as large as possible from the mechanical viewpoint, so that the gradient is as slow as possible. The length in—the x-direction—of the cross-section of the electromagnetic radiation beam with the dimming units 704, 706 is named $\Delta x$. The first dimming unit 704 has an exponential gradient dimming behavior that is the inverse of the dimming behavior of the second dimming unit 706. The dimming units 704, 706 are shifted with respect to each other such that the left side of the cross-section 708 with the first dimming unit 704 corresponds with a position a on the first dimming unit 704, a indicating the distance from the start of the gradient zone of the first dimming unit 704 to the left side of the cross-section 708. The distance from the left side of the cross-section 708 to the start of the gradient zone of the second dimming unit 706 at the left side is denamed b. The transparency of the dimming system 702, i.e the effect of both dimming units 704, 706 can be calculated at different points of the cross-section. In the following, this will be done for the center of the cross-section, the left side of the cross-section and the right side of the cross-section. The transparency of the first dimming unit 704 in the center of the cross-section 708 of the E.M. radiation beam can be expressed as $$T_{1c} = e^{\alpha \cdot (a + \frac{\Delta x}{2})},$$

the transparency of the second dimming unit 706 in the center of the cross-section 708 of the E.M. radiation beam can be expressed as $$T_{2c} = e^{-\alpha \cdot (b + \frac{\Delta x}{2})},$$

such that the total transmission in the center of the cross-section of the E.M. radiation beam can be expressed as $$T_c = T_{1c} \cdot T_{2c} = e^{\alpha \cdot (a + \frac{\Delta x}{2})} e^{-\alpha \cdot (b + \frac{\Delta x}{2})} = e^{\alpha \cdot (a + \frac{\Delta x}{2} b - \frac{\Delta x}{2})} = e^{\alpha(a-b)}$$

For intermediate points between the left side and the right side of the cross-section, an equal transmission is obtained. In this way it can be seen that the attenuation indeed is equal over the complete cross-section of the impinging electromagnetic beam. The position of the active area or cross-section 708 for the example of FIG. 7a, i.e. the position where the cross section 708 of the impinging E.M. radiation beam is positioned on the dimming units 704, 706, is shown by the rectangles indicated with a and b in FIG. 7b. In the combined exploded views in FIG. 7c, the transmission characteristics 720, 722 of each of the dimming units 704, 706 over the width of the cross-section of the E.M. radiation beam with each of the dimming units 704, 706, and the corresponding combined transmission characteristic 724 for the cross-section area are shown. As can be witnessed, the overall transmission is of the order of 4% in this case, and constant. The use of exponential gradient dimming behavior allows to obtain a real constant dimming intensity over the cross-section of the impinging E.M. radiation beam. Functions other than exponential functions describing the gradient dimming behavior can be used as well, as long as the multiplication of the functions is substantially constant over the cross-section of the impinging E.M. radiation beam with the combined dimming units. For other functional inverse behavior, the dimming over the cross-section differs from being constant, but typically will be significantly better than if only a single variable dimming means is used. In fact, the adjective 'substantially' in 'substantially constant' means that the non-uniformity of the projected image is acceptable, for both single projector images as for systems, where different images are combined into 1 'big' image. To obtain this, more than two dimming units may also be used. It is an advantage of the present embodiment of the invention that the dimming behavior is constant over the cross-section 708 of the impinging E.M. radiation beam within 5%, preferably 3%, more preferably 1%, even more preferably 0.1%, still more preferably 0.01%, most preferably is exactly constant. As is illustrated, the latter is obtained for exponential gradient dimming behavior that is inverse in two dimming units 704, 706. The variable dimming system described above, can be combined with a discrete filter or it can be combined with influencing of the light output by the lamp power, e.g. if the variable dimming system only allows a variable dimming behavior in a sub-range of the interval 0% attenuation to 100% attenuation.

It is an advantage of the present embodiment that a constant dimming is obtained over the cross-section of the impinging electromagnetic radiation beam with a dimming system positioned outside the aperture of an electromagnetic radiation beam guiding means. In the case of e.g. a projection system, wherein an integration rod is used, the dimming means can be positioned outside the aperture of the optical components in the projection system, i.e. for example after the integration rod. In this case the homogeneity of the impinging radiation is much more constant over the cross-section of the beam, such that the heat requirements for the dimming means are significantly smaller, than for a dimming means positioned in front of a homogenizing means, such as an integration rod. There may furthermore be other constraints, such as mechanical constraints, that prevent positioning the dimming means upstream the light path compared to the homogenizing means. With the present dimming system, it is possible to position the dimming means at any position in the electromagnetic radiation beam, even where the position in the cross-section of the electromagnetic radiation beam has a relation with the position on an object at which the beam is imaged, without losing brightness uniformity on the screen.

In a further embodiment the invention relates to a dimming system as described in the previous embodiment, whereby at least one of the dimming units is used as a folding mirror. Whereas, as shown in FIG. 3, the two dimming units can be positioned substantially perpendicular to the impinging electromagnetic radiation beam, in the present embodiment e.g. the first dimming unit 320 is used as a folding mirror. The dimming unit 320 then is such that the reflected E.M. radiation continues its way through the optical system, whereby the transmitted E.M. radiation is not used any further. This E.M. radiation can be e.g. absorbed by some heat sink. The second dimming unit 330 then typically is positioned in the light path of the reflected light. Alternative setups whereby the second dimming unit 330 is used as a folding mirror and the first dimming unit 320 is not, or whereby both the first dimming unit 320 and the second dimming unit 330 are used as folding mirrors are also covered by the present invention. The dimming units used as a folding mirror can comprise a coating for filtering certain parts of the electromagnetic beam. For example in a projection system using a light beam, the coating can be such that it acts as a cold/hot mirror, so that also infrared and/or ultraviolet light is removed from the incoming light beam and so that it does not influence the optical components downstream the optical light path. This coating also may be part of the coating used for obtaining the gradient dimming behavior.

Figure 8:
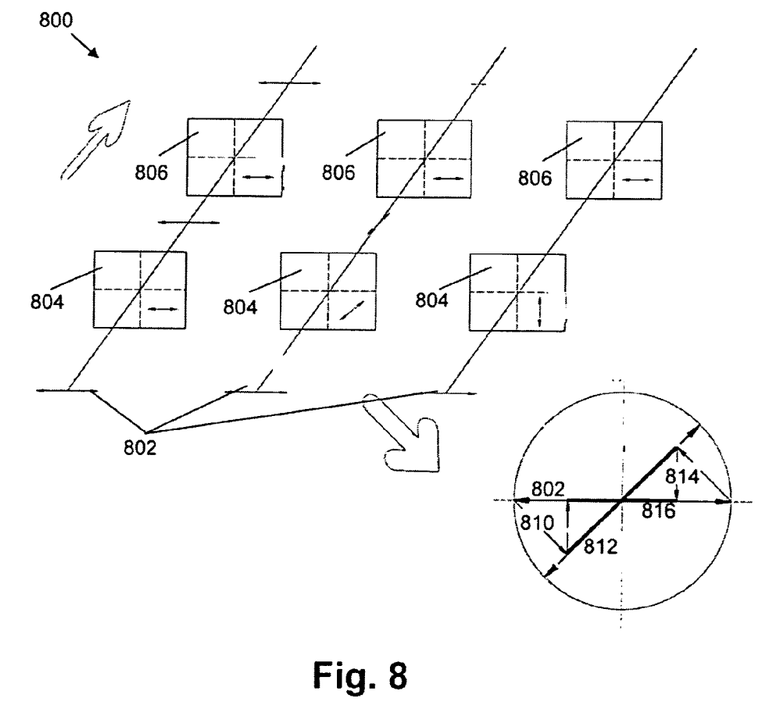
FIG. 8 is an illustration of the dimming mechanism of a dimming system based on polarization according to a third embodiment of the present invention.
Figure 9:
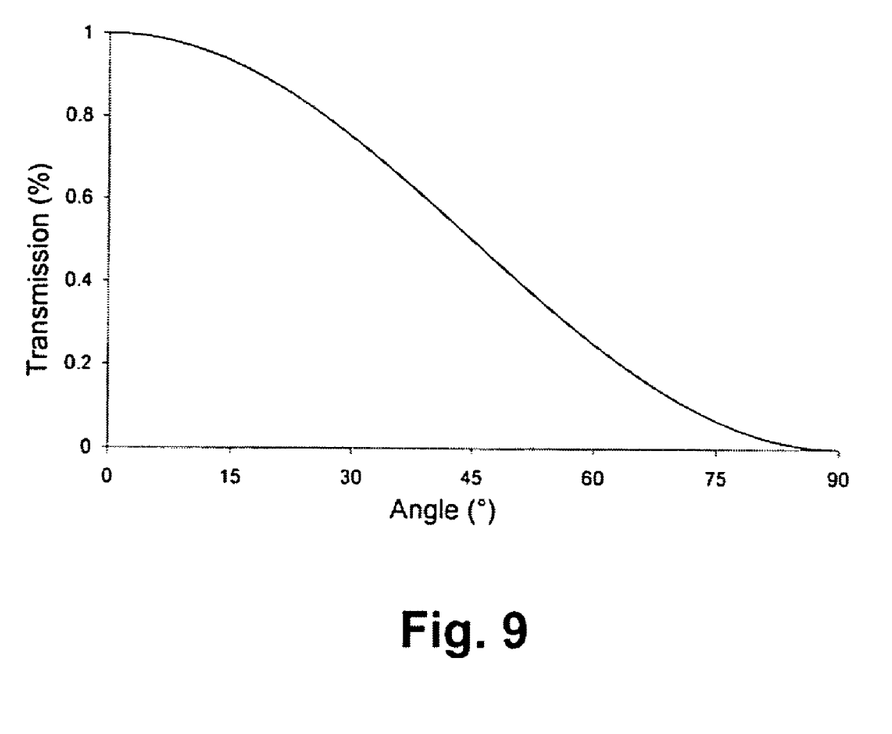
FIG. 9 is an illustration of the angle dependency of the transmission behavior of a dimming system for the angle between the polarization direction of a first polarizer and the polarization direction of an impinging light beam, according to the third embodiment of the present invention.

In a third embodiment, the invention relates to a dimming means for an optical system based on the use of polarization filters. Polarization is an electromagnetic characteristic of light rays that teaches something about the direction of the electromagnetic fields associated with the light. The present embodiment is especially useful for projection systems using polarized light, but it is not limited thereto. The present embodiment can also be applied to projection systems based on unpolarized light, albeit in a more limited way. The limited use of the dimming means in a projection system using unpolarized light is caused by the limitation that the maximal light throughput will be 50%, as a first polarizer will block half of the light. If the projection system uses polarized light, e.g. if the light valves used are e.g. liquid crystal based transmissive or reflective light valves, typically the light beam impinging on the dimming means will be polarized in a specific direction, i.e. all light rays transmitted by a transmissive light valve or reflected by a reflective light valve will be forced to have that specific polarization direction, further called the first polarization direction, and the light will be called linearly polarized light. The dimming means comprises at least one polarizer, which is an optical component that reacts differently upon different polarization states of the incident light. Different types of polarizers are available on the market. The polarizer may be a linear polarizer, having a maximum transmission for linearly polarized light with a specific polarization direction and a smaller transmission for light having a polarization direction that makes an angle with the preferential polarization direction of the polarizer. Designs with other polarizers, such as a circular polarizer also can be obtained. For a linear polarizer, the transmission behavior decreases gradually when the polarizer is turned gradually from a situation whereby the polarization direction of the linearly polarized light is parallel with the preferential polarization direction of the polarizer to a situation whereby the polarization direction of the linearly polarized light is perpendicular to the preferential polarization direction of the polarizer. In FIG. 8 the use of a dimming system 800 having two polarizers 804, 806 is shown for three different dimming situations of impinging polarized light. It will be obvious by a person skilled in the art that other types of polarization using other polarizers can also result in dimming. The impinging light beam has a first polarization direction 802, by way of example horizontal. The impinging light beam is dimmed by passing through the combination of the two polarizers 804, 806. The first polarizer 804 determines the polarization direction it transmits by way of its preferential polarization direction, and thus the amount of light transmitted. The second polarizer 806, which is optional and which is used to improve the signal quality, transmits a polarization state equal to the one of the incident light rays. On the left hand side of FIG. 8 the situation wherein the orientation of the first polarizer 804 is such that it transmits the polarization direction that is parallel with the first polarization direction 802. For the second polarizer 806, the same effect occurs, as this second polarizer 806 is chosen such that it has the same polarization direction as the polarization direction of the incoming light beam, i.e. as the first polarization direction 802. In this example, substantially no dimming is obtained. It is to be noted that the transmission behavior of a polarizer may be less than ideal, such that a small amount of light is lost by absorption or reflection in the polarizers anyway. A second situation, where the preferential polarization orientation of the first polarizer 804 is rotated over 45 degrees with respect to the incident polarization direction 802, is shown in the center of FIG. 8. In an exploded view, the details of the polarization directions and the reduction of the light intensity is shown. Due to the rotation of the preferential polarization direction of the first polarizer 804 a portion of the light to be transmitted is selected which is proportional to the first projection 810 of the initial polarization state 802 on the polarization direction of the first polarizer 804, resulting in an intermediate polarization state 812 with a polarization direction equal to the polarization direction of the first polarizer 804. In other words, the incident light beam is, due to this first projection 810, reduced in intensity by passing through the first polarizer 804, as can be seen from the length of the polarization vector. In addition, the polarization direction of the second polarizer 806 is again not parallel with respect to the polarization direction of the light incident on it, as this is now under an angle of 45° with respect to the original polarization direction of the beam impinging on the dimming system 800. Therefore, a second projection 814 has to be taken into account, the projection now being a projection of the intermediate polarization state 812 of the light beam onto the polarization direction of the second polarizer 806, leading to the conversion of the intermediate polarization state 812 of the light beam into a resulting polarization state 816. This results in a total throughput of about 50% (if the polarizers 804, 806 are supposed to work ideally). A third situation, shown at the right-hand side of FIG. 8, illustrates total blocking of the light beam. In this case the preferential polarization direction of the dimming polarizer 804 is perpendicular to the incident polarization state, thus no light is transmitted in the ideal situation and the light beam is completely dimmed. FIG. 9 illustrates the dimming capability of the dimming system 800 according to the present embodiment, showing for each angle between the preferential direction of the first polarizer 804 and the polarization direction of the incident beam 802, the amount of throughput for ideal polarizers. As the dimming means are put in the projection system, it can easily be correlated to a feedback system such that automatic adjustment of the light intensity can be obtained. Alternatively, the dimming means based on polarizers also can be positioned outside the projection system. It is furthermore also an advantage of the present embodiment that the amount of components needed to implement this dimming system are limited as often in projection systems polarised light is already used such that only one additional polarizer needs to be used instead of two. In this case, the function of e.g. the second polarizer 806 is done by a polarizer that is already present in the projection system. Typical projection systems using polarized light are LCD-projectors, projectors intended for stereo applications which are based on polarization, etc.

In a fourth embodiment, the present invention relates to a dimming system comprising a single variable diffuser means for use in a projection system. This embodiment comprises the same features and advantages as the variable diffuser means described as possible variable dimming means used for a single dimming unit of the dimming system according to the first embodiment of the present invention. The variable diffuser means allows to apply a variable degree of diffusing for an impinging light beam. The light thus is spread over a larger solid angle. If an aperture or a light homogenizing means is used after the variable diffuser means, only part of the light in the light cone is selected in the system. It is to be noted that the selection means, i.e. the aperture or the entrance of the light homogenizing means, is not varied during variable dimming, but that the degree of diffusing of the impinging light is varied such that a variable dimming can be obtained. A more detailed description is given in the description of the second type of variable dimming means used as possible dimming unit in the first embodiment of the present invention and the corresponding figures, i.e. FIG. 5 and FIG. 6.

In a fifth embodiment, the present invention refers to an optical system having a dimming means according to any of the previous embodiments, whereby the optical system furthermore comprises a feedback system with a light sensor in the optical system. The light sensor is preferably located outside the light path such that it does not influence the image on the screen. Possible positions are for instance behind a partially transparent folding mirror or on a position where stray light occurs, e.g. on the housing of the system. This way, the light sensor can, after calibration, provide a value representative for the light intensity that is emitted to the screen. A typical detector that can be used is e.g. a photodiode, or a sensor such as the TAOS TSL230 sensor, which emits a signal of which the frequency is proportional to the light intensity the sensor is subjected to, although the invention is not limited thereto. A communication line between the detector and the dimming means is provided so that the dimming means of the projection system can be automatically adjusted to dim the projection system to a desired value. If systems with multiple channels are used, linked communication between the different projectors enables brightness uniformity in the entire system. The control of the dimming means, i.e. the adjustment of the amount of dimming, also can be performed externally, i.e. the control of the amount of dimming may be performed by a user of the projection system, instead of by an automatic adjustment system.

The dimming systems of the embodiments of the present invention allow to apply a selectable degree of dimming and have the advantage that the amount of dimming is equal for the whole light beam cross-section, even if the dimming system is not positioned in the aperture plane. These high quality dimming systems can be used for any type of dimming of electromagnetic radiation. Typical applications for the dimming systems are dimming to match the light output of different projectors, e.g. in a multi-projector system where the different projectors may have inherent differences in light output, dimming in projection systems used for simulating both day conditions and night conditions, and projection wherein dynamic contrast enhancement is needed. The latter is used e.g. in motion pictures where the contrast between different scenes to be displayed can be very large. The dark part of a dark scene sometimes should be displayed e.g. $10^3$ or more times darker than the bright part of a bright scene. The above-described dimming systems allow to obtain dynamic contrast enhancement to optimize displaying of such scenes. This "dynamic contrast" adaptation needs to be done on a reasonable timescale, but not extremely fast: milliseconds are not necessary as the eye needs some time to adapt anyway. With the dimming means according to embodiments of the present invention, this dynamic contrast adaptation can be performed on a seconds timescale or even less.

Other arrangements for accomplishing the objectives of the dimming means embodying the invention will be obvious for those skilled in the art. It is to be understood that although preferred embodiments, specific constructions and configurations as well as materials have been discussed herein for devices according to the present invention, various changes or modifications in form and detail may be made without departing from the scope and spirit of this invention. For example, most examples of dimming means are given for use in projection systems although the invention also relates to dimming means for use in systems using any other type of electromagnetic radiation. Other applications can be e.g. measurement systems wherein a beam of electromagnetic radiation, e.g. X-rays, is used as probe and whereby, depending on the type of sample that is studied, the intensity of the illumination beam should be adjusted. The dimming means then consequently need to be adjusted such that transparent materials (to the wavelength of radiation used) respectively blocking materials are used that transmit or block that specific electromagnetic radiation. Also, although the current invention is described related to devices, the invention also relates to the corresponding methods for dimming.

The invention claimed is:

1. A variable dimming system for dimming an electromagnetic radiation beam, the dimming system comprising at least two dimming units, both being sequentially arranged in relation to the propagation way of the electromagnetic radiation beam and mutually movable, each of the at least two dimming units having an attenuation characteristic which is position dependent with respect to the cross-section of the electromagnetic radiation beam, wherein the attenuation characteristic of each dimming unit is obtained by a position dependent transmissivity behavior or a position dependent reflectivity behavior or a position dependent diffusity behavior, wherein the at least two dimming units are configured such that their combined dimming behavior is spatially substantially constant over a cross-section of the electromagnetic radiation beam perpendicular to a direction of travel of the electromagnetic radiation beam; and wherein the attenuation characteristic of each of the dimming units comprises a substantially complete attenuation of said electromagnetic radiation beam in a first area of said dimming unit, substantially no attenuation of said electromagnetic radiation beam in a second area of said dimming unit and a continuously decreasing attenuation on a trajectory between the first and the second area;

wherein said continuously decreasing attenuation of the first dimming unit substantially changes according to a first functional behavior and said continuously decreasing attenuation of the second dimming unit substantially changes according to a second functional behavior, such that combination of the first and the second functional behavior is substantially a constant; and wherein said first functional behavior is expressed by an exponential function and said second functional behavior is expressed by a function which is an inverse of said exponential function.

2. A variable dimming system according to claim 1, wherein said combined dimming behavior is selectable at least within a sub-range of the range 0% to 100%.

3. A variable dimming system according to claim 1, wherein the spatially substantially constant dimming behavior includes having a mean dimming factor over said cross-section, the dimming behavior over the cross-section being within at least 5% of said mean dimming factor.

4. A variable dimming system according to claim 1, wherein combination of the first and second functional behavior comprises multiplication of functions related to the first and second functional behavior.

5. A system using electromagnetic radiation and comprising a variable dimming system according to claim 1.

6. A system according to claim 5, the system comprising electromagnetic radiation guiding means having an aperture plane, wherein said variable dimming system is positioned in the electromagnetic radiation path significantly upstream or significantly downstream said aperture plane.

7. A system according to claim 5, furthermore comprising feedback means for generating a signal representative of a dimming fraction of the electromagnetic radiation.

8. A system according to claim 7, the feedback means comprising a sensor.

9. A system according to claim 7, furthermore comprising means for automatically adjusting the variable dimming system based on the signal obtained from the feedback means.

10. A system according to any of claim 5, wherein said system using electromagnetic radiation is a projection system using light.

11. The use of a dimming system according to claim 1 for any of matching the light output of different projectors having inherent differences in light output, displaying in day mode and in night mode with a single projector or providing dynamic contrast enhancement.

12. A method for dimming a electromagnetic radiation beam, comprising selecting a dimming behavior of at least a first and a second dimming unit;

wherein each of the at least two dimming units has a attenuation characteristic which is position dependent with respect to the cross-section of the electromagnetic radiation beam, and wherein the attenuation characteristic of each dimming unit is obtained by a position dependent transmissivity behavior or a position dependent reflectivity behavior or a position dependent diffusity behavior, combining the selected dimming behavior of each of the at least first and second dimming units such that the combined dimming behavior is spatially constant over a cross-section of an impinging electromagnetic radiation beam generated by an electromagnetic source, wherein the attenuation characteristic of each of the dimming units comprises a substantially complete attenuation of said electromagnetic radiation beam in a first area of said dimming unit, substantially no attenuation of said electromagnetic radiation beam in a second area of said dimming unit and a continuously decreasing attenuation on a trajectory between the first and the second area;

wherein said continuously decreasing attenuation of the first dimming unit substantially changes according to a first functional behavior and said continuously decreasing attenuation of the second dimming unit substantially changes according to a second functional behavior, such that combination of the first and the second functional behavior is substantially a constant; and wherein said first functional behavior is expressed by an exponential function and said second functional behavior is expressed by a function which is an inverse of said exponential function.

\* \* \* \* \*